United States Patent
Slawson

[15] 3,689,821
[45] Sept. 5, 1972

[54] CORRECTION SYSTEM FOR NUMERICAL CONTROLS

[72] Inventor: Kenneth Leonard Slawson, Depew, N.Y.

[73] Assignee: Hourdaille Industries, Inc., Buffalo, N.Y.

[22] Filed: March 9, 1971

[21] Appl. No.: 122,550

Related U.S. Application Data

[63] Continuation of Ser. No. 681,776, Nov. 9, 1967, abandoned.

[52] U.S. Cl. .................................................318/632
[51] Int. Cl. ..........................................G05d 23/275
[58] Field of Search ....................................318/632

[56] References Cited

UNITED STATES PATENTS

| | | | |
|---|---|---|---|
| 3,039,032 | 6/1962 | Fowler | 318/18 X |
| 3,324,365 | 6/1967 | Jones | 318/28 |
| 3,340,447 | 9/1967 | MacDonald | 318/162 X |
| 3,405,257 | 10/1968 | Rantsch et al. | 318/18 X |
| 3,491,277 | 1/1970 | Brainard | 318/632 |
| 3,491,278 | 1/1970 | Stobbe | 318/632 |
| 3,555,254 | 1/1971 | Gerber | 318/632 X |
| 3,492,551 | 1/1970 | Rouxel et al. | 318/632 X |

Primary Examiner—Benjamin Dobeck
Attorney—Hill, Sherman, Meroni, Gross & Simpson

[57] ABSTRACT

A correction system for numerical controls which compensates for non-linearity in rack tooth spacing wherein a primary shift register shifts its active state for each primary interval over the range of movement of the rack drive (such as every 10 inches), and a secondary shift register is activated to register sub-intervals of a selected one of the primary intervals (such as one inch sub-intervals between 50 and 60 inches). A series of correction pulses may be generated in response to transitions in the state of either of the shift registers to provide any desired degree of precision. The correction pulses may be used to add or delete pulses in a feedback pulse train so as to bring the electronically registered position of the rack into substantial conformity with the actual rack position over the operating range of the system.

13 Claims, 7 Drawing Figures

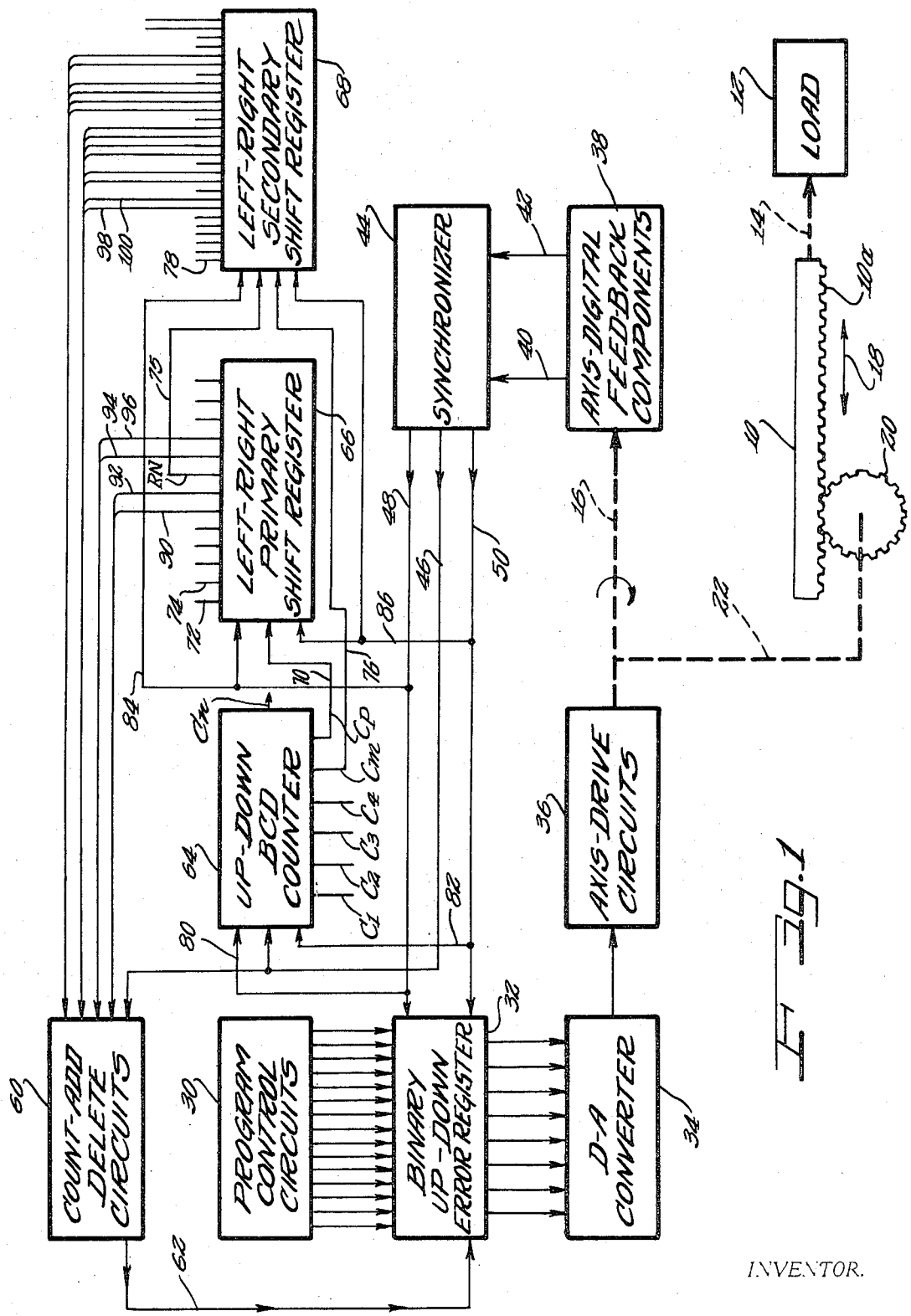

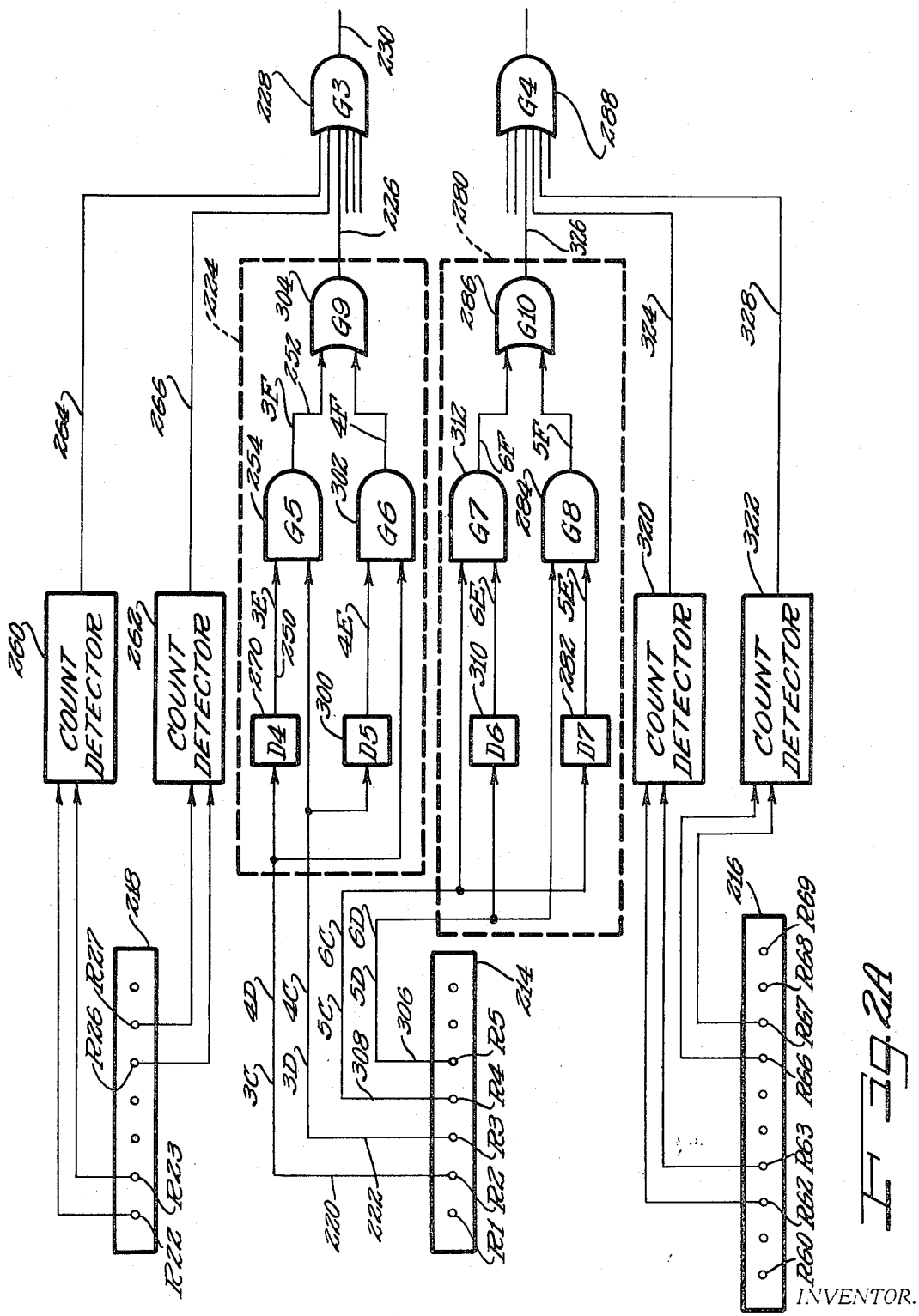

INVENTOR.
Kenneth Leonard Slawson 3,689,821

CORRECTION SYSTEM FOR NUMERICAL CONTROLS

CROSS-REFERENCES TO RELATED APPLICATIONS

The present application is a continuation of Ser. No. 681,776 filed Nov. 9, 1967, now abandoned.

By way of specific example only and not by way of limitation the present invention has been applied to an incremental positioning system as disclosed in my pending application U.S. Ser. No. 652,968 filed July 12, 1967, and the disclosure of this pending application is incorporated herein by reference in its entirety.

BACKGROUND OF THE INVENTION

In numerical control systems accuracy may be limited by practical manufacturing tolerances in the output drive transmission. Conversely, a much less expensive mechanical output system may be feasible if each numerical control can be made to compensate for the specific non-uniformities in the individual drive transmission with which it is used.

SUMMARY OF THE INVENTION

It is therefore an object of the present invention to provide a method and apparatus for compensating control systems for errors due to manufacturing tolerances wherein each individual control can be simply and economically adapted to adjust for a specific pattern of mechanical errors.

Another object of the invention is to provide a correction system which utilizes reliable digital circuitry and which is readily connected to compensate for varying patterns of mechanical errors with any desired degree of accuracy.

A further object is to provide digital error correcting circuitry which is adaptable to controls where the direction of operation is reversible.

Still another object of the invention is to provide digital correction circuitry which is readily applied to either absolute or incremental type numerical control systems.

A more general object of the invention is to provide a novel method and means for compensating control systems for mechanical errors.

Other objects, features and advantages of the present invention will be apparent from the following detailed description taken in connection with the accompanying drawings.

BRIEF DESCRIPTION OF THE DRAWINGS

FIG. 1 is an exemplary block diagram of a numerical control system embodying a correction system and method in accordance with the present invention;

FIGS. 2A and 2B (generically designated FIG. 2) show the application of the system and method of FIG. 1 to compensate for the specific error pattern in a particular control apparatus, FIG. 2B being a continuation of FIG. 2A to the right;

DESCRIPTION OF THE PREFERRED EMBODIMENT

Figure 2B:
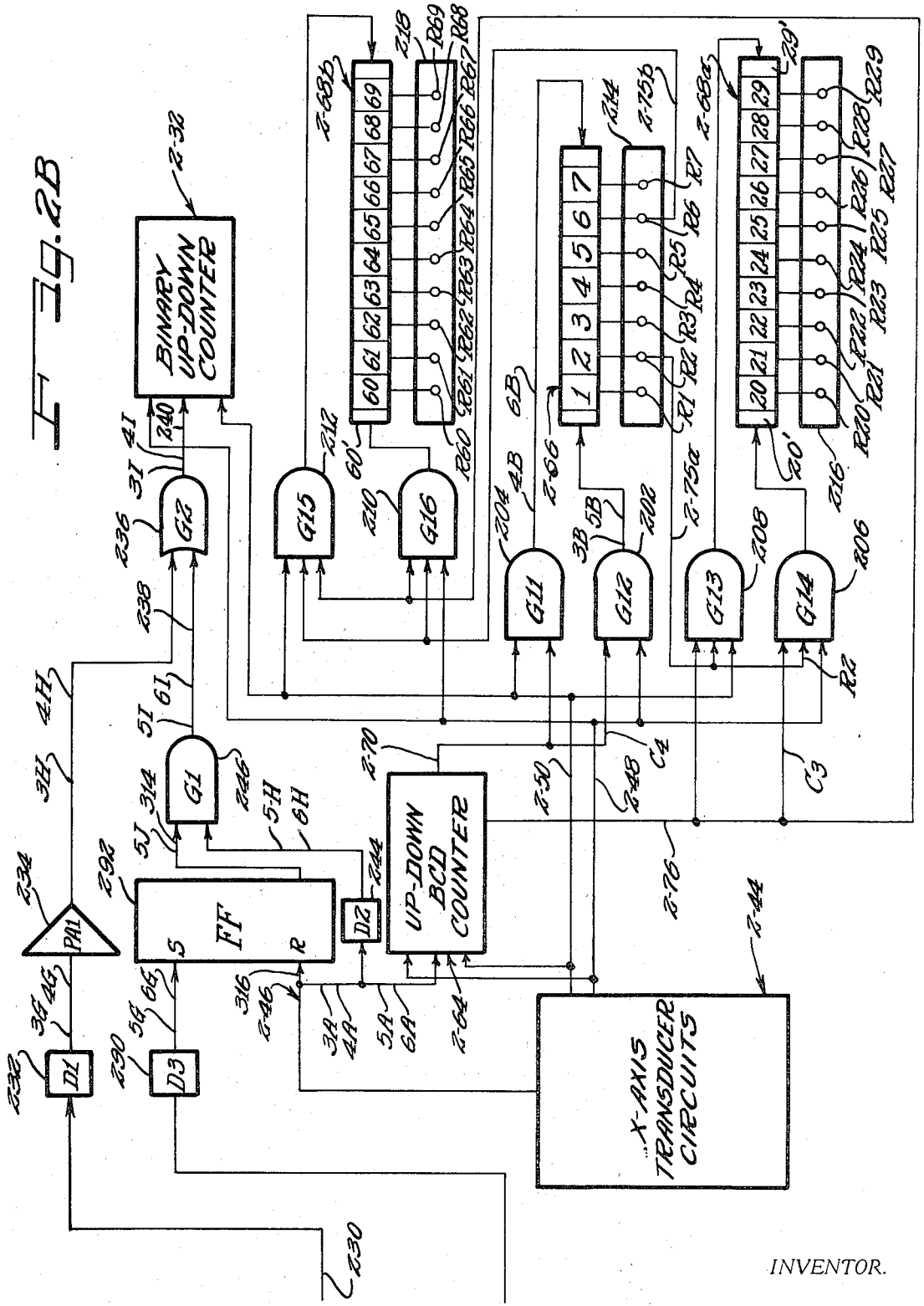

By way of exemplary illustration and not by way of limitation, FIGS. 1 through 6 illustrate a correction system for incremental type numerical positioning control systems. A specific example of such a system is found in my aforementioned pending application, the disclosure of which is incorporated herein by reference.

Also by way of example and not by way of limitation, the correction system of the present invention is illustrated as compensating for mechanical errors and specifically for errors in the spacing of teeth 10a of a rack output drive element 10. Such mechanical errors may be the result of unavoidable manufacturing tolerances, or as a significant alternative may represent the manufacturing tolerances which permit of substantial manufacturing economies and which are acceptable when utilized with the correction system of the present invention.

Also by way of example and not by way of limitation, the system of FIG. 1 utilizes a closed loop control system wherein a feedback pulse train is generated which is taken to represent electronically the actual instantaneous position of the mechanical output element 10 and of the load 12 mechanically coupled therewith as indicated by the dash line 14.

In the specific system illustrated, it is contemplated that the primary mechanical error introduced by the output transmission is between the angular position of the shaft represented by dash line 16 and the linear position of the rack which is movable in the directions indicated by double headed arrow 18. Thus, it may be assumed that the feedback pulse train accurately reflects the angular position of shaft 16 but that there are regularly recurring errors in the position of the rack or output element 10 as a function of the angular position of the shaft 16. Simply for diagrammatic purposes, shaft 16 is illustrated as being mechanically coupled with a pinion 20 by means of a coupling diagrammatically indicated as dash line 22.

In the specific numerical control system illustrated in FIG. 1, a program control circuits component 30 may respond to a suitable input such as punched tape or the like to insert successive incremental digital command signals into error register 32. As described in the aforementioned copending application, the input to register 32 may be in binary code and may include, for example, 16 binary digits and a sign bit. The six least significant digits of the command placed in the register 32 control the six least significant stages of a digital to analog converter such as indicated at 34 in FIG. 1. The most significant stage of the converter is controlled by the sign register stage of the register 32 while the next to the most significant stage of the converter 34 is controlled in such a way that a relatively large analog error signal is supplied to the drive circuits as indicated at 36 whenever the error in the register 32 exceeds a value of about 63. In this way, the load 12 is moved toward the commanded position at a relatively high speed until a predetermined error count appears in the register 32, after which the analog error signal is proportional to the digital error in the register 32 and the drive circuits 36 begin a proportional slow down. In the event of an overshoot of the commanded end position for the load 12, the error register 32 will show a change of sign and a proportionally increasing magnitude of error which will be reflected in the analog error signal from the converter 34 reversing the direction of operation of the drive circuits 36 and returning the load 12 to the commanded end position which is represented by a zero count in the register 32. When the load 12 remains in the commanded end position for a predetermined time interval, a relay is actuated in the drive circuits component 36 signalling for deenergization of the drive. This operation is explained in detail in the aforementioned copending application.

Also described in said copending application is the means for generating a feedback pulse train intended to represent the actual position of the load 12 and which pulse train is normally supplied directly to the error register 32 to progressively reduce the digital error registered therein. This pulse train is generated by a photoelectric position transducer device or the like driven by shaft 16 and included in the digital feedback components 38 which are specifically described in the copending application. As described in the copending application, movement of the feedback transducer results in electrical signals at lines 40 and 42 whose phase relation represents the direction of movement of shaft 16 and whose frequency is a function of the rate of rotation of the shaft. These signals on lines 40 and 42 are translated by means of a synchronizer component 44 as described in the copending application into a pulse train on line 46 and a "high" signal on line 48 for rotation in one direction and a "high" signal on line 50 for rotation in the opposite direction. As described in the copending application, a "high" signal on line 48 causes the register 32 to count in an "up" direction while a "high" signal on line 50 causes the error register to count in a "down" direction.

Thus, if movement of the rack to the right as viewed in FIG. 1 is considered to be in the positive direction with respect to a command entered in the register 32 from the program control circuits 30, then rotation of shaft 16 in the direction to effect such positive movement of the rack 10 would cause the line 50 to be "high" causing the positive command signal in the register 32 to be progressively reduced as the rack 10 moved in the commanded positive direction. Conversely, if the displacement command from the program circuits 30 were negative, movement of the rack 10 to the left as viewed in FIG. 1 would cause the synchronizer 44 to place line 48 in a "high" condition causing the register 32 to count feedback pulses in an "up" direction so as to progressively reduce the negative displacement command signal as the command is executed. It will be understood that for a negative displacement command signal from the program circuits 30, the complement of the desired displacement is entered in the register 32 so that the successive feedback pulses on line 46 required to return the register to a zero error condition will correspond to the desired displacement. As in the case of a positive command signal, if the output system including rack 10 and load 12 should overshoot the commanded end position, the register 32 would continue counting feedback pulses and register an error of reverse polarity which would result in a reversal of the drive circuits 36 so as to return the load 12 in the positive displacement direction toward the commanded end position.

By way of specific illustration only and not by way of limitation, in the illustrated embodiment it is contemplated that mechanical errors will be compensated for by compensating the feedback train supplied to line 46. The concept in this embodiment is to supply a feedback pulse train to the register 32 which will represent with substantial accuracy the actual movement of the load 12 rather than simply the movement of the common drive transmission element such as 16 which drives both the feedback components 38 and the transmission train 22, 20, 10, 14 which in turn drives the load 12. In this way, any regularly recurring mechanical errors between the rotation (for example) of the position transducer of components 38 and the translational displacement (for example) of the load 12 can be compensated for by the digital circuitry.

Specifically in the embodiment of FIG. 1, the pulse train from synchronizer 44 is shown as being supplied by line 46 to a count-add-delete component 60 which may, for example, add pulses to the feedback train of line 46 or delete pulses from the feedback pulse train on line 46 so as to supply a compensated feedback pulse train at line 62 leading to the input of the error register 32. In this way, the commanded displacement in the error register 32 is reduced in magnitude substantially in accordance with the actual displacement of the load 12 rather than simply in accordance with the displacement of the feedback transducer of components 38.

Since the errors in the mechanical transmission between shaft 16 and load 12 may be determined as a function of the displacement of shaft 16, compensating pulses may be inserted by circuits 60 as a function of displacement of the shaft 16. In the illustrated embodiment, the feedback pulse train at 46 accurately reflects the displacement of the shaft 16, and pulse counting means including up-down binary coded decimal counter 64, primary shift register 66 and secondary register 68 are provided for signalling the position of shaft 16 to any desired degree of precision and for controlling the add delete circuits 60 to insert or delete feedback pulses so as to compensate for a given mechanical transmission system.

In the generalized system of FIG. 1, an output $C_p$ of BCD counter 64 is shown connected to the input of a primary shift register 66 and an output Cm of an earlier stage of the counter is connected to secondary shift register 68. The secondary shift register 68 is shown as being activated under the control of primary outputs such as $R_N$. The functioning of the counter 64 and shift registers 66 and 68 will most easily be understood by referring to a specific example.

Suppose that each feedback pulse at line 46 on the average represents a displacement of the load 12 of 0.001 inch. Suppose further that the operating range over which compensation is desired corresponds to 60 inches of movement of the load or 60,000 feedback pulses. In this case the output C4 associated with the fourth decade of counter 64 would connect with conductor 70($p = 4$) so as to supply six pulses to shift register 66 as the load 12 moved from a position corresponding to zero inches of displacement to a position corresponding to 60 inches of displacement. The first stage of shift register 66 might provide a "high" output at primary output 72 during movement of the load approximately between zero displacement and a displacement of 9.999 inches. At a displacement of approximately 10 inches, specifically at a displacement of shaft 16 corresponding to 10,000 feedback pulses at line 46, a second stage of shift register 66 would be activated placing output line 74 in a "high" condition. Thus, the interconnection 70 between counter 64 and primary shift register 66 serves to establish primary correction intervals during which corrections may be selectively programmed in accordance with any particular error pattern.

The primary correction intervals may be further subdivided into secondary correction intervals by the use of connections such as the one indicated at 75 between primary terminal $R_N$ of the shift register 66 and the secondary shift register 68, and at 76 between output $C_m$ of counter 64 and the secondary shift register 68. Again a specific example will facilitate an understanding of the generalized disclosure. Thus assume that a correction is desired within a secondary interval within the primary interval corresponding to the activation of primary output 74 ($N = 2$). In this case, output 74 would be connected via conductor 75 to gate means associated with the input of shift register 68 so as to control the transmission of pulses to the secondary shift register via a conductor 76 leading from the counter 64. For example, the output line 76 might connect with the output $C_3$ of the third decade of binary coded decimal counter 64 ($m = 3$) so as to supply a pulse to secondary shift register 68 for each 1,000 feedback pulses generated on line 46. Nominally, therefore, the successive secondary output lines such as indicated at 78 of the secondary shift register 68 would be successively activated as the load 12 moved through successive one inch increments between a displacement of 10 inches and a displacement of 19.999 inches. More precisely, the secondary output line 78 would be "high" between a count of 10,000 feedback pulses from line 46 and a count of 10,999 feedback pulses.

The direction of counting of binary coded decimal counter 64 is shown as being controlled by lines 80 and 82 connected with lines 48 and 50, respectively, and similarly the direction of shifting of shift registers 66 and 68 is shown as being controlled by means of lines 84 and 86 connecting with the lines 48 and 50. Thus, for displacement of the load 12 in one direction, counter 64 will count up and pulses therefrom on lines 70 and 76 will cause the shift registers 66 and 68 to successively activate the output lines from left to right, while for the opposite direction of movement of the load 12, the counter 64 will count down and the shift registers will sequentially activate the respective output lines beginning with the rightmost output line and moving to the left as viewed in FIG. 1.

In the specific circuitry given by way of example and not by way of limitation in FIG. 2, the add delete circuits 60 are activated in response to a transition between activation of one of a pair of stages of one of the shift registers and a succeeding stage. In conformity with this specific example, primary output lines 90 and 92 and 94 and 96 are shown connected with the add delete circuits 60. Simply by way of example, the circuits 60 may respond to the deactivation of line 90 and the activation of line 92 to add one or more pulses to the feedback pulse train at line 62, while the circuits may respond to the deactivation of line 94 and the activation of line 96 to delete one or more pulses from the feedback pulses train at line 62. In the specific embodiment of FIG. 2, the circuit 60 will effect a corresponding change in the error register in response to the deactivation of line 96 and the activation of line 94, and the deactivation of line 92 and the activation of line 90, as the load 12 moves in the opposite direction. By way of example, if circuits 60 add a pulse at line 62 at a given point in the range of operation of load 12 as the load moves in the negative direction with the error register 32 counting feedback pulses in the "up" direction, then if on a subsequent move the load moves past the same point but in the positive direction, the circuits 60 should again add a pulse at line 62 since at this point the error register would be counting in the "down" direction. In other words if the successive teeth 10a of the rack 10 have a greater than average spacing at a particular value of displacement, then the load 12 would move farther than represented by the pulse train 46, and a pulse should be added at line 62. Similarly, as the rack moves in the opposite direction, the teeth with the greater than average basing will again result in a greater movement of the load than represented in the feedback pulse train 46, and a further pulse should again be added to the line 62 at the output of the circuits component 60.

Various pairs of outputs of the secondary shift register 68 such as secondary outputs 98 and 100 are also shown connected with the add delete circuits component 60 so as to illustrate the insertion of a desired number of correction pulses at selected secondary correction intervals during movement of the shaft 16. The add delete circuit 60 may respond to transitions at secondary output lines such as 98 and 100 in the same way as described with respect to the primary output lines such as 90 and 92 from primary shift register 66.

It will be apparent to those skilled in the art that more than one secondary shift register can be provided, or that plural gate circuits may be associated with the shift register 68 so as to enable its operation only at desired points in the operation of the primary shift register 66. Of course, the system of FIG. 1 need only be sufficiently general to take care of the range of correction problems which will be encountered in a practical situation, and it may be economical to make multiple use of particular digital circuitry or to take other conventional steps to minimize cost under a particular set of circumstances. With a modular arrangement of parts, essentially only the required amount of hardware for a given individual mechanical system would need to be employed. Examples of modular components are given in the aforementioned copending application. The interconnections of the various terminals of the system for each error pattern may be carried out by patch cords or other conventional mechanical selection means, for example.

DESCRIPTION OF THE EXEMPLARY CIRCUITS OF FIG. 2

FIG. 2 is intended to represent the application of the general circuitry of FIG. 1 to a specific individual mechanical output transmission having a specific mechanical error pattern. Thus, while the interconnections between counter 64 and shift registers 66 and 68, and between shift registers 66 and 68 and add delete circuits 60 in FIG. 1 are intended to be of a general nature, the interconnections in FIG. 2 are specific and represent the addition and deletion of feedback pulses at specific numerical counts. Further where the capacity of the counter 64 and the shift registers 66 and 68 may be thought of as representing the maximum amount of equipment which may be required for the worst case to be encountered in practice, FIG. 2 illustrates only the amount of equipment employed to effect correction for a specific individual transmission system.

To facilitate correlation of FIGS. 1 and 2, however, reference numerals have been applied in FIG. 2 wherein the last two digits correspond to the digits of the reference numerals of FIG. 1, for the parts in FIG. 2 generally corresponding to parts 32, 44, 46, 48, 50, 64, 66 and 68. More specifically, binary counter 2–32 of FIG. 2 may correspond to the error register 32 of FIG. 1, and transducer circuits component 2–44 of FIG. 2 may be thought of as corresponding to synchronizer component 44 of FIG. 1, for example. Conductors 2–46, 2–48 and 2–50 may correspond to lines 46, 48 and 50 in FIG. 1. The binary coded decimal counter 2–64 may be similar to the counter 64 except that counter 2–64 is considered to have a more limited number of stages (four decades) so that output line 2–70 receives a pulse for every 10,000 input pulses at line 2–46, and output line 2–76 receives a pulse for every 1,000 input pulses at line 2–46. The primary shift register 2–66 may correspond to the primary shift register 66 except that shift register 2–66 may have a more limited number of stages, namely stages Nos. 1 through 7 with primary output terminals designated R1 through R7.

The secondary shift register 68 of FIG. 1 has been illustrated in FIG. 2 as composed of two sections 2–68a and 2–68b, the section 2–68a being enabled via line 2–75a while the primary output R2 is "high," and the section 2–68b being enabled via line 2–75b while the primary output R6 is "high." The primary shift register 2–66 is shown as being controlled by two AND gates 202 and 204, while secondary register section 2–68a is controlled by AND gates 206 and 208, and section 2–68b is controlled by AND gates 210 and 212. Gates 202, 206 and 210 are partially enabled when line 2–48 is "high" and gates 204, 208 and 212 are partially enabled when lines 2–50 is "high." Thus, shift registers 2–66, 2–68a and 2–68b shift the active state from left to right as counter 2–32 counts feedback pulses in the "up" direction, and shift their active states from right to left as the counter 2–32 counts in the "down" direction.

By way of illustration, the output terminals R1–R7 of shift register 2–66 are shown as associated with a terminal strip 214. For the sake of convenience the terminal strip 214 is shown at the left in FIG. 2A as well as in association with the shift register 2–66 at the right in FIG. 2B. Similarly terminal strips 216 and 218 associated with secondary shift register sections 2–68a and 2–68b have the respective terminals thereof designated by reference characters R20 through R29 and R60 through R69, and these terminal strips are also shown at the left in FIG. 2A. Any convenient selective connection means may be utilized with terminal strips 214, 216 and 218 so as to facilitate the desired interconnections of the system for each specific individual mechanical system to be compensated.

For the specific system illustrated, it may be assumed that in initial start up of the system, counter 2–64 would be set to zero at a zero reference point of the mechanical system (corresponding to an extreme position of the rack 10), and that primary shift register 2–66 would have its stage No. 1 activated or "set" to provide a "high" output at R1 and would have its remaining stages inactive or "reset." Then, at a count of 10,000, (as the load 12 moved from the reference point in the negative direction), the active stage of shift register 2–66 would be shifted to the right to place stage No. 2 in active condition with a "high" output at terminal R2 and line 2–75a partially enabling gates 206 and 208.

In the illustrated embodiment, shift register section 2–68a is provided with a dummy stage (No. 20') in advance of stage No. 20 which stage 20' would be activated at the start-up of the system, so that stage No. 20 would only be activated when pulse No. 10,000 occurred on line 2–46. (In the illustrated system pulse No. 10,000 results in a pulse on line 2–76, which overlaps in time with the high output at line 2–75a to produce an output pulse from gate 206 or 208).

If the rack 10 continues to move in a negative direction from the zero reference point, stage No. 21 of shift register 2–68a is activated at a count of 11,000 feedback pulses, stage No. 22 at a count of 12,000 feedback pulses and so on. At a count of 20,000 pulses, in the illustrated embodiment a dummy stage 29' is "turned on." Then when the rack 10 is moved in the opposite direction dummy stage 29' goes off and stage 29 goes on as the count changes from 20,000 to 19,999. This count transition corresponds to the BCD counter 2–64 counting down from a count of zero to a count of 9,999, the resultant carry pulse at 2–70 being transmitted by gate 204 to shift the active stage of shift register 2–66 from No. 3 to No. 2. The carry pulse at line 2–76 is of sufficient duration to overlap in time with the "high" signal at line 2–75a as the count goes from zero to 9,999, so that gate 208 transmits a pulse at this time.

As the output system moves to a displacement corresponding to a count of 20,000, stage No. 2 of the primary shift register is deactivated and stage No. 3 is activated. Referring specifically to FIG. 2A, output lines 220 and 222 are shown connected with terminals R2 and R3 of the primary shift register, and these conductors lead to a count detector circuit designated generally by the reference numeral 224. The circuit 224 is designed to respond to the activation of line 222 and/or the deactivation of line 220 while the system is counting in the "up" direction to generate a correction indicating pulse at line 226 leading to an input of OR gate 228. The correction signalling pulse is transmitted by output line 230 of gate 228 through a delay component 232 and a pulse amplifier component 234 to an input of an OR gate 236. This correction signalling pulse at the input of gate 236 is combined with the normal feedback pulse train at conductor 238 so that the output of the gate 236 at line 240 will have an additional pulse therein in comparison to the original feedback pulse train at conductor 2–46, FIG. 2B at the output of component 2–44. The original pulse train at 2–46 is supplied via a delay component 244 and an AND gate 246 to the input line 238 of gate 236.

Figure 3:
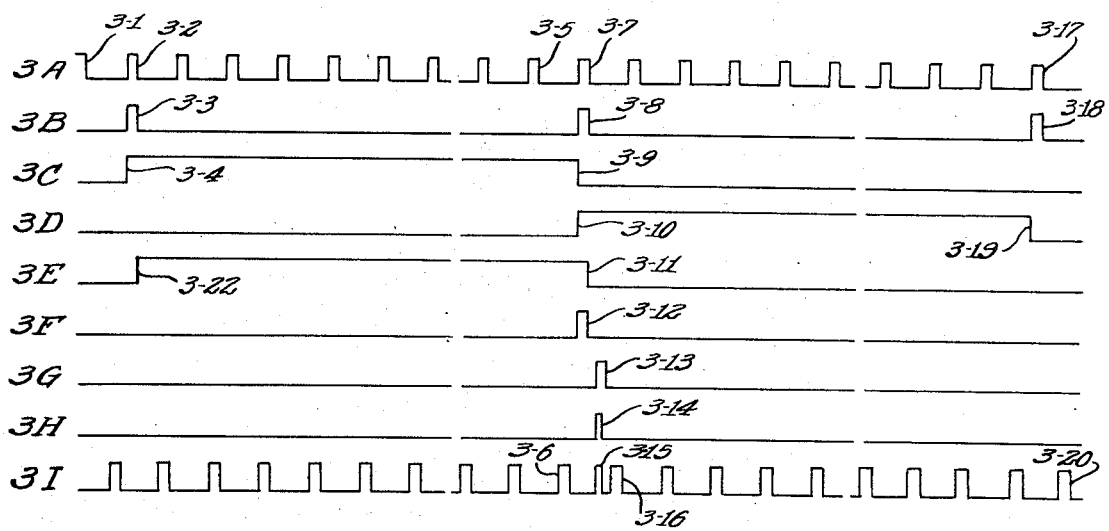
FIGS. 3A through 3I (generically designated FIG. 3) show waveform diagrams for the system of FIG. 2 where correction pulses are to be added and the binary counter is counting in the "up" direction.

This type of operation is illustrated by the waveforms of FIG. 3, wherein FIG. 3A illustrates the feedback pulse train at conductor 2–46; FIG. 3B shows the output of gate 202; FIG. 3C shows the waveform at conductor 220; FIG. 3D shows the waveform at conductor 222; FIG. 3E shows the waveform at conductor 250 within count detector 224; FIG. 3F shows the waveform at conductor 252 at the output of AND gate 254; FIG. 3G shows the output waveform of delay component 232; FIG. 3H shows the output waveform of pulse amplifier 234; and FIG. 3I shows the corrected pulse train supplied to the input line 240 of the binary counter or register 232.

For the specific embodiment shown in FIG. 2, pulse 3–1 of FIG. 3 is pulse No. 9,999, and the pulse designated 3–2 is pulse No. 10,000 which produces an output pulse 3–3 at the output of gate 202 and activates stage No. 2 of the primary shift register 2–66.

The pulse indicated at 3–4 in FIG. 3C at the output terminal R2 of the primary shift register serves to partially enable gates 206 and 208. Where the circuitry continues to count in an "up" direction, gate 206 is further enabled from line 2–48. Where as illustrated in FIG. 3C, gate 202 is essentially enabled simultaneously with the leading edge of the feedback pulse 3–2, gate 206 will transmit a pulse as the count reaches 10,000 shifting secondary shift register stage 2–68a from its dummy stage 20' to stage No. 20, thus placing terminal R20 in "high" condition. Thereafter, at each count such as 11,000, 12,000 and the like a pulse is transmitted by gate 206 activating stages 21, 22 and so forth of the shift register section 2–68 in sequence.

Referring to FIG. 2A, it will be noted that count detector 260 responds to the transition between output terminals R22 and R23, and that count detector 262 responds to the transition between output terminals R26 and R27 of the secondary shift register section 2–68a. Thus output line 264 of detector 260 supplies a correction signalling pulse at the transition from a count of 12,999 to a count of 13,000, and output line 266 from detector 262 supplies a correction signalling pulse in response to a transition from a count of 16,999 to a count of 17,000. These correction signalling pulses at lines 264 and 266 result in the addition of pulses to the feedback pulse train represented in FIG. 3I. Thus, while pulse 3–5 may represent pulse No. 19,999 supplied to counter component 2–64, the corresponding pulse at the input of counter 2–32 is pulse No. 20,001 received by counter 2–32.

The next pulse 3–7 in FIG. 3A is No. 20,000 supplied to counter 2–64 and results in an output pulse 3–8 at the output of gate 202. This pulse deactivates stage No. 2 of the shift register as indicated at 3–9 in FIG. 3C and activates stage No. 3 as indicated at 3–10 in FIG. 3D. The waveform of FIG. 3C at the input of delay component 270 results in a negative going pulse as indicated at 3–11 in FIG. 3E after a selected time delay. Since the outputs represented by FIGS. 3D and 3E are both "high" for a predetermined time interval in response to a count of 20,000, gate 254 transmits a pulse as indicated at 3–12 in FIG. 3F. This pulse is delayed by component 232 to provide a delayed pulse 3–13 as shown in FIG. 3G, and this input to the pulse amplifier 234 results in a pulse 3–14 being supplied to gate 236. The gate 236 serves to mix this pulse 3–14 with the feedback pulse train of FIG. 3I as indicated by pulse 3–15 of said pulse train. Pulse 3–15 is pulse No. 20,002 supplied to counter or register 2–32. Pulse 3–7 of FIG. 3A results in a pulse 3–16 at the input to the counter 2–32 as shown in FIG. 3I which is pulse No. 20,003. Thus at this point in the operation, primary shift register 2–66 has served to insert one count directly, and secondary shift register section 2–68a has served to insert 2 correction pulses.

As indicated at 3–9 in FIG. 3–C, at a count of 20,000 the output from primary terminal R2 of shift register 2–66 falls to a "low" value. The timing may be such that the pulse at line 2–76 at a count of 20,000 is transmitted by gate 206 so that the secondary shift register 2–68a is shifted to dummy stage No. 29'. The carry pulses on line 2–76 which is connected to the input of the last decade of counter 2–64 will occur when the count is changed from 19,999 to 20,000 or from 20,000 to 19,999.

If counting in the "up" direction continues, pulse 3–17 in FIG. 3A may represent pulse No. 30,000 supplied to counter 2–64 and may result in a pulse 3–18 supplied to primary shift register 2–66 shifting the register from stage No. 3 to stage No. 4 as indicated by the negative going edge at 3–19 in FIG. 3D. The corresponding pulse 3–20 at the input of counter 2–32 is pulse No. 30,003.

Figure 5:
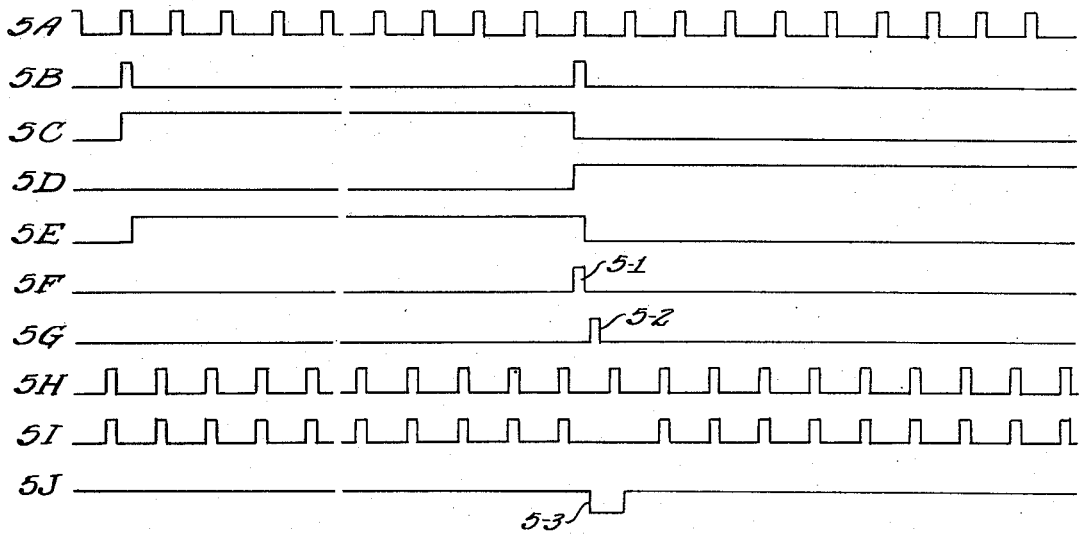
FIGS. 5A through 5J (generically designated FIG. 5) show waveforms for the system of FIG. 2 where the correction pulses are to be subtracted and where the binary counter is counting "up.

If the input program is such that counting continues in the "up" direction, then at a count of 40,000, a transition occurs between primary output terminals R4 and R5 which is sensed by count detector 280 including delay component 282, AND gate 284 and OR gate 286. The operation which is represented in FIG. 5 is analogous to that shown in FIG. 3 and results in a correction signalling pulse as indicated at 5–1 in FIG. 5F at the output of gate 284 which pulse is transmitted by OR gate 288 to delay component 290. The output of delay component 290 is indicated at 5–2 in FIG. 5G. The points at which the waveforms of FIGS. 5A through 5G are taken have been indicated by reference characters in FIG. 2 corresponding to the figure numbers. Thus, reference character 5A has been applied at the output of component 2–44. FIG. 5A is found at this point. With this understanding, the manner in which the correction signalling pulse 5–2 is generated will be clear from the previous description with respect to FIG. 3. The leading edge of the pulse 5–2 serves to set flip-flop component 292 so that the reset output of the flip-flop goes "low" disabling gate 246. The reset output of flip 292 is indicated in FIG. 5J and it will be observed that the timing of this output is such as to block one of the normal feedback pulses supplied to the lower input of gate 246 as represented in FIG. 5H. The corrected waveform with one pulse deleted is represented in FIG. 5I.

Figure 4:
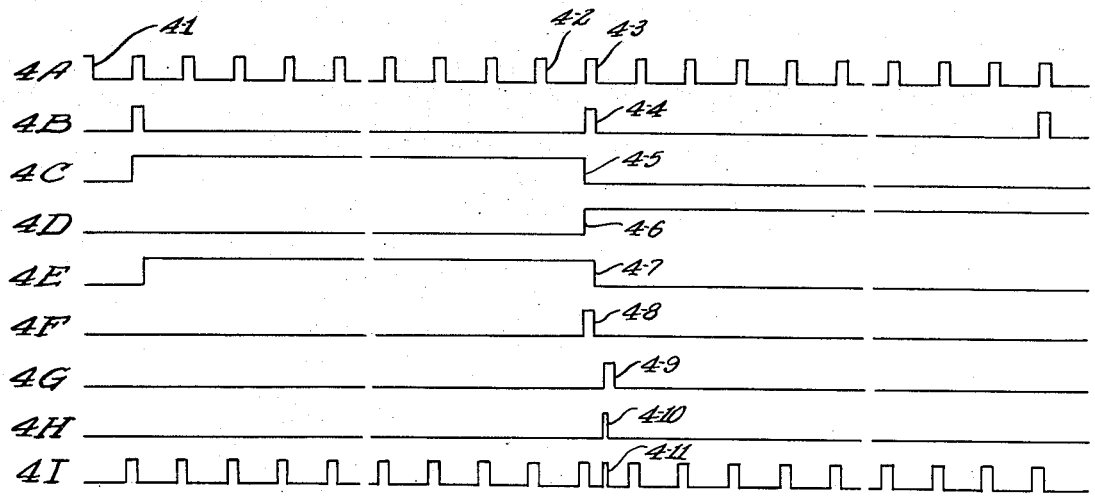
FIGS. 4A through 4I (generically designated FIG. 4) show waveforms illustrating the operation of the embodiment of FIG. 2 where correction pulses are to be added and the binary counter is counting "down;"

FIG. 4 shows the operation of the circuit of FIG. 2 for a transition from activation of primary output R3 to activation of primary output R2. This transition takes place between a count of 20,000 and a count of 19,999, having reference to a count of feedback pulses from components 38 beginning at a hypothetical reference point previously referred to. This count is represented by the condition of BCD counter 2–64 in conjunction with the condition of the primary shift register 2–66.

FIG. 4A represents the feedback pulse train at the output 2–46 of circuits 2–44, FIG. 2B. Pulse 4–1 in FIG. 4A may correspond to pulse No. 30,000 while pulse 4–2 may represent pulse No. 20,000 and pulse 4–3 may represent pulse No. 19,999. A carry pulse is generated at lines 2–76 and 2–70 of counter 2–64 as the counter counts down from a count of 0 to a count of 9,999. The resultant output of gate 204 is indicated at 4—4 in FIG. 4B. The actuation of the primary shift register 2–66 causes line 222, FIG. 2A, to go "low" as indicated at 4–5 in FIG. 4C, and causes line 220 to go "high" as indicated at 4–6 in FIG. 4D. The output of delay component 300, FIG. 2A is shown in FIG. 4E, the delayed negative going transition being indicated at 4–7. As comparison of FIGS. 4–D and 4E shows that gate 302 will transmit a pulse 4–8 as shown in FIG. 4F at the time of transition to a count of 19,999. This pulse is transmitted by OR gates 304 and 228 and produces a pulse at the output of delay component 232, FIG. 2B, as indicated at 4–9 in FIG. 4G. The output of pulse amplifier 234 is indicated at 4–10 in FIG. 4H. The resultant pulse train at the output of gate 236 is shown in FIG. 4I. It will be noted that there is an additional pulse identified by reference numeral 4–11 in the pulse train 4I as a result of the transition to a count of 19,999 as the counting stages count in a "down" direction.

Figure 6:
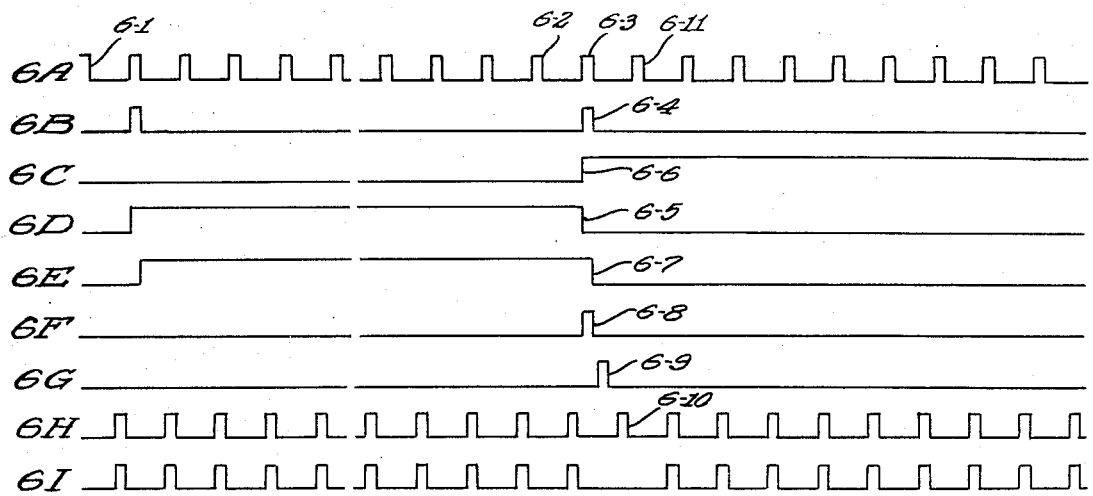
" and FIGS. 6A through 6I (generically designated FIG. 6) show waveforms for the system of FIG. 2 operating such that correction pulses are to be subtracted and the binary counter is counting "down."

FIG. 6 illustrates the operation of deleting counts while the counting stages are counting in the "down" direction. Thus, FIG. 6A illustrates the pulse train at the output of the transducer circuits component 2–44 during count down from a relatively high value. Thus pulse 6–1 may correspond to a count of 50,000, pulse 6–2 may correspond to a count of 40,000 (many of the intervening 1,000 pulses having been omitted in FIG. 6A), and pulse 6–3 may correspond to pulse No. 39,999. At a count of 40,000, the count in the BCD counter 2–64 is 0, and stage No. 5 of the primary shift register 2–66 is active. The next feedback pulse at line 2–46 as represented by pulse 6–3 shifts the counter 2–64 to a count of 9,999 with carry pulses at lines 2–76 and 2–70. The carry pulse at line 2–70 is transmitted by gate 204 as indicated at 6–4 in FIG. 6B to shift the primary register from stage No. 5 to stage No. 4. As a consequence conductor 306 connected to primary output terminal R5, FIG. 2A, goes "low" as indicated at 6–5, and conductor 308 connected with primary output terminal R4 goes high as indicated at 6—6 in FIG. 6C. The delayed output of delay component 310 is indicated at 6–7 in FIG. 6E, and the output of AND gate 312 is indicated at 6–8 in FIG. 6F. The resultant output from delay 290, FIG. 2B is indicated at 6–9 in FIG. 6G. FIG. 6H indicates the delayed output from delay component 244, and FIG. 6I shows the output from AND gate 246. It will be observed that the pulse 6–10 of the pulse train of FIG. 6H has been blocked at gate 246. This has occurred because the pulse 6–9 of FIG. 6G is supplied to the set input of flip-flop 292, FIG. 2B, driving the reset output of this flip-flop "low" so that conductor 314 provides an inhibiting input to gate 246 for the time interval between pulse 6–9 and the next feedback pulse which is indicated at 6–11 in FIG. 6A and which is connected by means of conductor 316 to the reset input of flip-flop 292. The action of the flip-flop 292 corresponds to that illustrated in FIG. 5J.

Referring to FIG. 2A, it will be observed that additional count detectors are indicated at 320 and 322 which are controlled by transitions of the secondary shift register 2–68b for transitions between output terminals R62 and R63, and between output terminals R66 and R67. The count detectors 320 and 322 may correspond identically to the count detector 280, for example, so that a transition between R62 and R63 in either direction of counting will result in a correction signalling pulse at line 324. This correction signalling pulse will cause a deletion of one pulse in the pulse train supplied to the error register or up-down counter 2–32 in the same way as a pulse at the output line 326 of count detector 280. Similarly, count detector 322 will supply a correction signalling pulse at line 328 in response to a transition between secondary output terminals R66 and R67 in either direction of counting. When counting in the "up" direction, therefore, a pulse will appear at line 324 in response to a count transition between a count of 52,999 and a count of 53,000 and a pulse will appear at line 328 in response to a count transition between a count of 56,999 and a count of 57,000. Similarly, in counting in the "down" direction, a pulse will appear at line 328 in response to a transition between a count of 57,000 and a count of 56,999, and a pulse will appear at line 324 in response to a transition from a count of 53,000 and a count of 52,999.

The following Tables I and II summarize the correction action of the specific embodiment of FIG. 2 with respect to the pulse train supplied at the input of the BCD counter 2–64.

TABLE I

| Count Transition (Counting Up) | Corrective Action (For Example of FIG. 2) |
| --- | --- |
| 12,999–13,000 | Add one pulse |
| 16,999–17,000 | Add one pulse |
| 19,999–20,000 | Add one pulse |
| 39,999–40,000 | Delete one pulse |
| 52,999–53,000 | Delete one pulse |
| 56,999–57,000 | Delete one pulse |

TABLE II

| Count Transition (Counting Down) | Corrective Action (For Example of FIG. 2) |
| --- | --- |
| 57,000–56,999 | Delete one pulse |
| 53,000–52,999 | Delete one pulse |
| 40,000–39,999 | Delete one pulse |
| 20,000–19,999 | Add one pulse |
| 17,000–16,999 | Add one pulse |
| 13,000–12,999 | Add one pulse |

It will be seen that for the embodiment of FIG. 2, it is assumed that the tooth spacing of the rack 10 is larger than normal at locations corresponding to counts of 13,000, 17,000 and 20,000, and that the tooth spacing is too small at regions corresponding to counts of 40,000, 53,000 and 57,000. The system of the present invention is connected, therefore, to supply additional counts at the input of counter or error register 2-32 in the region of counts 13,000, 17,000 and 20,000 and to delete pulses in the region of counts 40,000, 53,000 and 57,000 so that the count in the counter 2-32 will substantially accurately reflect the actual position of the load 12.

While various digital circuitry may be utilized for detecting count transitions, an exemplary count transition detecting circuitry is illustrated at 224 and at 280 in FIG. 2A.

SUMMARY OF OPERATION

In accordance with the method and apparatus of the present invention, the pattern of mechanical errors of a specific piece of equipment is first determined. For example, it may be determined that to compensate for errors in tooth spacing for a given rack such as rack 10 shown in FIG. 1, it is sufficient to add one feedback pulse to the feedback pulse train from synchronizer 44, FIG. 1 at regions of the rack corresponding to feedback pulse counts of 13,000, 17,000 and 20,000 and to delete one pulse from the feedback pulse train for regions of the rack corresponding to counts of 40,000, 53,000 and 57,000. For this particular error pattern, the generalized circuit of FIG. 1 would be interconnected as shown in FIG. 2. These interconnections may be carried out in any convenient manner, for example by means of conventional "patch" cords which plug into suitable receptacles associated with terminals of the components 60, 64, 66 and 68 of FIG. 1. The operation of the circuit of FIG. 2 in adding and deleting feedback pulses at the input 240 of the binary up-down counter 2-32 corresponding to the error register 32 of FIG. 1 has been summarized in the foregoing tables I and II.

ALTERNATIVE EMBODIMENT

The aforementioned copending application Ser. No. 652,968 filed July 12, 1967 teaches that the program control circuits component 30 of FIG. 1 may comprise a general purpose digital computer. In this case, the computer itself may be programmed to compensate for a specific mechanical error pattern. The major benefit of this embodiment is that no additional hardware is required. All corrections are made to the data after they have been read from punched tape or the like, but before they are loaded into the up-down error register 32.

The basic principles upon which this method is based are the following.

1. The machine tool must be calibrated along some correction increment, the choice of which is arbitrary.
2. An increment designation number should then be assigned to every correction increment.
3. The computer then stores this table of information including increment designation numbers, absolute value of correction increments, correction increment size and the correction values.
4. As new moves are read into the computer, the computer checks the table to see whether any correction is necessary and, if so, it determines how much from the previously stored table. The computer then makes the correction before loading the data coordinates into the position control loop including the error register 32.

The following Table III is an example of the type of table which would be stored in the computer.

TABLE III

| Increment Designation Number | Absolute Value of Correction Increment | Correction Increment Size | Correction |
|---|---|---|---|
| 0 | 0 | 0 | 0 |
| 1 | 10 | 10 | +1 |
| 2 | 20 | 10 | −1 |
| 3 | 21 | 1 | 0 |
| 4 | 22 | 1 | 0 |
| 5 | 23 | 1 | +1 |
| 6 | 24 | 1 | 0 |
| 7 | 25 | 1 | 0 |
| 8 | 26 | 1 | +1 |
| 9 | 27 | 1 | 0 |
| 10 | 28 | 1 | 0 |
| 11 | 29 | 1 | +1 |
| 12 | 30 | 1 | 0 |
| 13 | 40 | 10 | −2 |
| 14 | 50 | 10 | 0 |

A flow chart illustrating the sequence of operation would then be as follows.

Mechanical Error Compensation Flow Chart (a) $P_1 = P_2 = 0$
(b) Read new incremental move.
(c) Determine number of correction increments transversed. This is accomplished by additively comparing adjoining correction increments in the proper direction with the size of the new incremental move.
(d) Set pointer $P_2$ to the increment designation number representing the number of correction increments transversed.
(e) Add signed corrections between pointers $P_1$ and $P_2$.
(f) Appropriately compensate the incremental move by adding or subtracting counts.
(g) Set $P_1 = P_2$
(h) Use compensated move as incremental positioning coordinate.
(i) Return to (b)

An example in accordance with the flow chart is as follows.

EXAMPLE:

Step 1 - $P_1 = P_2 = 0$
Step 2 - New Move = +30,000
Step 3 -

| Is New Move ≥ | Increment Designation | Answer |
|---|---|---|
| 30 | 1 | Yes |
| 30 | 2 | Yes |
| 30 | 3 | Yes |
| 30 | 4 | Yes |
| 30 | 5 | Yes |

| | | |
|---|---|---|
| 30 | 6 | Yes |
| 30 | 7 | Yes |
| 30 | 8 | Yes |
| 30 | 9 | Yes |
| 30 | 10 | Yes |
| 30 | 11 | Yes |
| 30 | 12 | Yes |
| 30 | 13 | No |

∴ Number of correction increments transversed is 12.

Step 4 -    $P_2 = 12$
Step 5 -    $+1 -1 +1 +1 +1 = +3$
Step 6 -    Compensated New Move $= +30.003$
Step 7 -    $P_1 = P_2 = 12$
Step 8 -    New Move $= -5.000$

| Step 9 - Is New Move ≥ | Increment Designation | Answer |
|---|---|---|
| 5 | 12 | Yes |
| 5 | 11 | Yes |
| 5 | 10 | Yes |
| 5 | 9 | Yes |
| 5 | 8 | Yes |
| 5 | 7 | No |

∴ Number of Correction increments transversed is 5.

Step 10 -    $P_2 = 8$
Step 11 -    $+1 +1 = +2$
Step 12 -    Compensated New Move $= -4.998$

I claim as my invention:

1. In a control system for positioning an output element which system is subject to regularly recurrent but non-linear positioning errors and includes control means comprising an error register for controlling movement of said output element and digital feedback circuitry for transmitting to said error register a feedback pulse train which is a function of the displacement of the output element, the improvement comprising digital correction circuit means responsive to said feedback pulse train to sense the position of the output element and pre-programmed to supply a non-linear schedule of correction pulses to said control means as a function of movement of the output element to compensate for said regularly recurrent but non-linear errors.

2. In a control system including means for generating a feedback pulse train in accordance with movement of a drive transmission element, an error register responsive to said feedback pulse train to maintain an error count reflecting the distance to a desired end point, digital correction circuit means for compensating for errors in said system and comprising pulse counting means selectively programmed to be responsive to a predetermined selected number of pulses in said feedback pulse train to shift from a first state to a second state, and digital correction signalling means coupled with said error register for supplying thereto a correction signalling pulse in response to the shift of said pulse counting means from said first state to said second state, said pulse counting means comprising a primary counting circuit and a secondary counting circuit each having successive states, the secondary counting circuit being activated in response to a given state of the primary counting circuit, and the correction signalling means being responsive to a change of state of said secondary counting circuit to supply a correction signalling pulse to said error register.

3. In a control system including means for generating a pulse train in accordance with movement of a drive transmission element, correction circuit means for compensating for errors in said system and comprising pulse counting means selectively programmed to be responsive to a predetermined selected number of pulses in said pulse train to shift from a first state to a second state, and correction signalling means for generating a correction signalling pulse in response to the shift of said pulse counting means from said first state to said second state, said pulse counting means comprising shift register means having a series of outputs which are successively activated as the drive transmission element moves over a given range of positions, said correction signalling means being coupled to a selected pair of successive outputs of said shift register means for generating a correction initiating pulse in response to each transition from the activation of either one of said pair of outputs to the activation of the other of said pair of outputs.

4. A control system according to claim 3 with said correction signalling means comprising a pair of coincidence gate means with one of said pair of gate means having a first delayed input connected to one of said pair of outputs of said shift register means and having a second input connected to the other of said pair of outputs, and with the other of said pair of gate means having a first delayed input connected to said other of said pair of outputs and having a second input connected to said one of said pair of outputs, whereby said one of said gate means transmits a correction initiating pulse in response to a transition from activation of the one output to activation of the other output, and the other of said gate means transmits a correction initiating pulse in response to the transition from the activation of the other of said pair of outputs to the activation of said one of said pair of outputs of said shift register means.

5. A control system according to claim 4 with said shift register means comprising a primary shift register having a succession of primary outputs which are successively activated as the drive transmission element moves over a given range of positions so that each primary output corresponds to a predetermined segment of the range of positions, and said shift register means comprising a secondary shift register having successive secondary outputs including said pair of outputs to which said pair of coincidence gate means are connected.

6. The method of compensating for regularly recurring but non-linear mechanical errors in a specific digital control apparatus which comprises establishing a counting chain having outputs which are activated at respective intervals over the operating range of the system, pre-programming the counting chain by selecting a pair of outputs which are successively activated during operation in a region of the operating range needing correction for the specific control apparatus, generating a correction signalling pulse in response to each transition from activation of either of the pair of outputs to activation of the other of the pair of outputs, and effecting an incremental correction in the control apparatus in response to each correction signalling pulse and of polarity determined by the order of activation of a pair of outputs so as to tend to compensate for the mechanical error each time operation occurs in said region of the operating range regardless of the direction of operation of the control apparatus.

7. The method of compensating for regularly recurring mechanical errors in a specific digital control apparatus which comprises establishing a primary shift register having primary outputs which are activated during respective intervals over the operating range of the apparatus, connecting a secondary shift register to a selected primary output to be enabled during a selected interval of the operating range during which a correction is required, selecting a pair of secondary outputs of the secondary shift register which are successively activated during a selected sub-interval of the selected interval, and effecting an incremental correction in the control apparatus in response to each transition from activation of either of the pair of secondary outputs to activation of the other of said pair of secondary outputs so as to tend to compensate for the mechanical error each time operation occurs in said selected sub-interval of the operating range of the apparatus regardless of the direction of operation of the apparatus.

8. The method of operating a digital control system having a mechanical output which is subject to predetermined non-linear mechanical errors in being positioned in accordance with a succession of digital commands, which method comprises pre-establishing in said system a complementary non-linear error correction pattern as a function of displacement of said mechanical output, which pattern is essentially that required to compensate for such mechanical errors, and inserting digital correction signals in said system in accordance with the pre-established non-linear correction pattern for each digitally commanded movement of the mechanical output to cause the mechanical output to respond to each successive digital command.

9. A system for compensating for regularly recurring non-linear mechanical errors in a specific digital control apparatus capable of positioning a load at each of a series of incremental positions separated from each other by a predetermined uniform minimum displacement increment, which comprises digital register means capable of being selectively programmed to represent any of said incremental positions of said load for programming to respond to the load reaching a predetermined group of non-linearly displaced ones of said incremental positions at which said non-linear mechanical errors occur, and digital correction circuit means for coupling to said control apparatus to respond to the incremental displacement thereof and controlled by the digital register means to generate digital correction signals each representing said predetermined minimum displacement increment of the control apparatus in response to the load reaching respective ones of said group of non-linear displaced incremental positions and to substantially correct for the non-linear mechanical errors over the range of operation of the control apparatus.

10. In a control system for controlling movement of a drive transmission element which in turn drives an output element, wherein the displacement of the output element is a predetermined non-uniform function of the displacement of the drive transmission element over an operating range, control means for coupling to said drive transmission element to effect movement thereof substantially as a uniform function of successive displacement command signals, and correction circuit means coupled to said control means and pre-programmed to insert correction signals into said control means at predetermined intervals over said operating range so as to substantially compensate for the non-uniformity of said predetermined non-uniform function and thereby to position said output element substantially in accordance with the successive displacement command signals, said control means generating a pulse train which is substantially representative of the displacement of said drive transmission element, and said correction circuit means being responsive to said pulse train and generating a digital correction signal in response to the occurrence of successive predetermined numbers of pulses in said pulse train, said control means comprising a feedback transducer generating said pulse train as a function of displacement of said drive transmission element and a position register connected to receive pulses from the feedback transducer, said correction circuit means being coupled to said feedback transducer and being operative to modify the count in said position register at the occurrence of the successive predetermined numbers of pulses in said pulse train.

11. In a control system for controlling movement of a drive transmission element which in turn drives an output element, wherein the displacement of the output element is a predetermined non-uniform function of the displacement of the drive transmission element over an operating range, control means for coupling to said drive transmission element to effect movement thereof substantially as a uniform function of successive displacement command signals, and correction circuit means coupled to said control means and pre-programmed to insert correction signals into said control means at predetermined intervals over said operating range so as to substantially compensate for the non-uniformity of said predetermined non-uniform function and thereby to position said output element substantially in accordance with the successive displacement command signals, said control means generating a pulse train which is substantially representative of the displacement of said drive transmission element, and said correction circuit means being responsive to said pulse train and generating a digital correction signal in response to the occurrence of successive predetermined numbers of pulses in said pulse train, said correction circuit means serving to change the number of pulses in said pulse train thereby to compensate for said non-uniform function, said correction circuit means comprising pulse counting means receiving said pulse train prior to change of the number of pulses therein and being responsive to a predetermined number of received pulses to shift from a first state to a second state, and pulse train correction means for changing the number of pulses in said pulse train in response to the shift of pulse counting means from said first state to said second state.

12. A control system in accordance with claim 11 with said pulse counting means comprising a shift register having a first stage which is placed in active condition in response to a first input signal and having a second stage which is placed in an active condition by said pulse counting means in response to a predetermined number of pulses of said pulse train, said pulse train correction means comprising gating means having a first delayed input coupled to said first stage and having a second input coupled to said second stage, said gating means serving to generate a pulse in response to the coincidence of the delayed output of the first stage and the output of the second stage as said first stage is deactivated and said second stage activated.

13. A control system in accordance with claim 13 with said pulse train correction means being operative selectively to insert a pulse in said pulse train and to delete a pulse from the pulse train in response to the output from said gate means.

* * * * *